United States Patent [19]

Marumo

[11] 3,726,157
[45] Apr. 10, 1973

[54] CONTROL SYSTEM FOR AN AUTOMATIC TRANSMISSION

[75] Inventor: Nagayuki Marumo, Yokohama, Japan

[73] Assignee: Nissan Motor Company, Limited, Yokohama City, Japan

[22] Filed: Mar. 30, 1971

[21] Appl. No.: 129,446

[30] Foreign Application Priority Data

Apr. 4, 1970 Japan..................................45/28374

[52] U.S. Cl. ........................74/753, 74/759, 74/864, 74/866, 74/869
[51] Int. Cl. ..........................F16h 57/10, B60k 21/02
[58] Field of Search........................74/869, 864, 866, 74/753

[56] References Cited

UNITED STATES PATENTS

| | | | |
|---|---|---|---|
| 3,049,937 | 8/1962 | Lindsay | 74/869 |
| 3,541,887 | 11/1970 | Van Lent et al. | 74/869 X |
| 3,593,599 | 7/1971 | Dach | 74/869 |

*Primary Examiner*—Charles J. Myhre
*Assistant Examiner*—Thomas C. Perry
*Attorney*—McCarthy, Depaoli, O'Brien & Price

[57] ABSTRACT

A control system for an automatic power transmission of a motor vehicle providing basically four forward drive ratios, which control system includes two shift valves for controlling the fluid flow to one fluid pressure operated servo means of a first set of friction elements thereby to selectively provide those drive ratios. The control system also includes first speed and second speed control valves for controlling the fluid flow to the other fluid pressure operated servo means a second set of friction elements providing first speed and second speed drive ratios respectively thereby to selectively provide free wheel driving and engine brake driving at first and second speed drive ratios, respectively. Each of the shift valves has two principal positions which are combined so as to selectively pass a fluid pressure from a source of fluid pressure to fluid pressure operated servo ratio.

3 Claims, 3 Drawing Figures

CONTROL SYSTEM FOR AN AUTOMATIC TRANSMISSION

This invention relates to an automatic power transmission of a motor vehicle and, more particularly, to a control system for the power transmission. The control system proposed by this invention is specifically suited for use in an automatic power transmission providing basically four forward speed drive ratios and a single reverse drive ratio.

An automatic power transmission used in a motor vehicle commonly includes a control system for controlling the actuation of friction elements, such as friction clutches and brakes, which are selectively engaged and disengaged in sequence to effect successive shifts from one driving speed ratio to another. The control system conventionally employs a hydraulic control circuit to regulate the fluid flow to servo mechanisms connected to the friction elements and an electronic control circuit to control the operation of the hydraulic control circuit in accordance with varying driving conditions of the motor vehicle. In the hydraulic control circuit, it is a usual practice to use a solenoid valve for automatically controlling the operation of shift valves connected to the servo mechanisms for actuating the friction elements. The solenoid valve is controlled by the electronic control circuit in accordance with given variables, such as for example a vehicle speed, an effective throttle area of an engine carburetor, a road gradient at which the vehicle is running, an engine temperature or any other driving condition of the motor vehicle whereby the transmission performance is maintained optimum to meet the driving condition of the motor vehicle.

In a four-speed ratio power transmission of this type, it is customary to use three planetary gear sets and at least five friction elements, such as front clutch, rear clutch, third brake, second brake and low and reverse brake, which are selectively actuated to effect an intended speed drive ratio. In such power transmission, it is desirable to have free wheeling units, such as one-way clutches or brakes, combined with the planetary gear sets for permitting the use of a minimized number of friction elements, whereby the transmission can be manufactured in simple and compact construction. The use of a minimized number of friction elements is beneficial not only for reducing shocks resulting from shifting between the different gear ratios but also for simplifying the construction of the control system for the power transmission. The free wheeling unit usually operates in such a manner as to cause a drive coupling to take place between the members of the drive unit when the power flow is in a normal condition, that is, when the vehicle is driven by the engine whereas when the power flow is reversed, that is, when the power flow takes place from the vehicle to the engine as during of coasting downhill the drive connection between the engine and the vehicle is interrupted because of the inherent construction thereof.

In known motor vehicle using such power transmission, it is often required to effect engine braking when the transmission is maintained to establish the second speed drive ratio. Thus, it is desirable to provide an additional friction element in the power transmission for establishing a drive connection between the engine and the motor vehicle. The use of such additional friction element is reflected by a complicated construction of the control system, so that it is difficult to control the transmission in a manner to cause the friction elements to remain uncoupled although these are not required to be engaged once the desired speed range is selected.

It is, therefore, an object of this invention to provide a novel and improved control system for an automatic power transmission of the type providing basically four forward speed drive ratios and a single reverse drive ratio.

Another object of this invention is to provide a control system for an automatic power transmission of the type above set forth, which control system is simplified in construction and is economically manufactured with use of a minimum number of component parts.

Still another object of this invention is to provide a control system which is adapted to selectively effect an engine braking at a desired speed range.

A further object of this invention is to provide a control system adapted to preclude an accident occurring in the power transmission even when the control system happens to mulfuction, thereby giving a rise to a driving safety.

According to the present invention, the above and other objects can be accomplished by providing a manual selector valve, first and second shift valves cooperating with each other, and first speed and second speed control valves associated with the manual valve. The shift valves operate to control the fluid flow to the servo mechanisms of the friction elements for thereby effecting a shift between different gear ratios while the control valves operate to control the fluid flow to the servo mechanisms of the friction elements for thereby bringing about an engine braking action at selected driving speed ratios. The shift valves are responsive to an electric signal generated by an electronic control circuit in accordance with given operational variables. These shift valves have two principal positions, respectively, providing a first speed forward drive ratio (free wheel driving), a second speed forward drive ratio (free wheel driving), a third speed forward drive ratio (free wheel driving), and a fourth speed forward drive ratio. The first speed control valve is made operative to effect engine braking solely when the manual selector valve is set in its manual first speed position. The second speed control valve is made operative to effect engine braking only when the manual selector valve is set in its manual and second speed positions.

The control system of the present invention is specifically directed to an automatic power transmission providing basically four forward driving speed ratios and a single reverse driving speed ratio. Such transmission will be herein shown and described as having a hydrodynamic torque converter by way of example only. It should, however, be understood that the control system of this invention is also applicable to any other types of automatic power transmissions insofar as similar driving speed ratios are achieved thereby.

Figure 1:
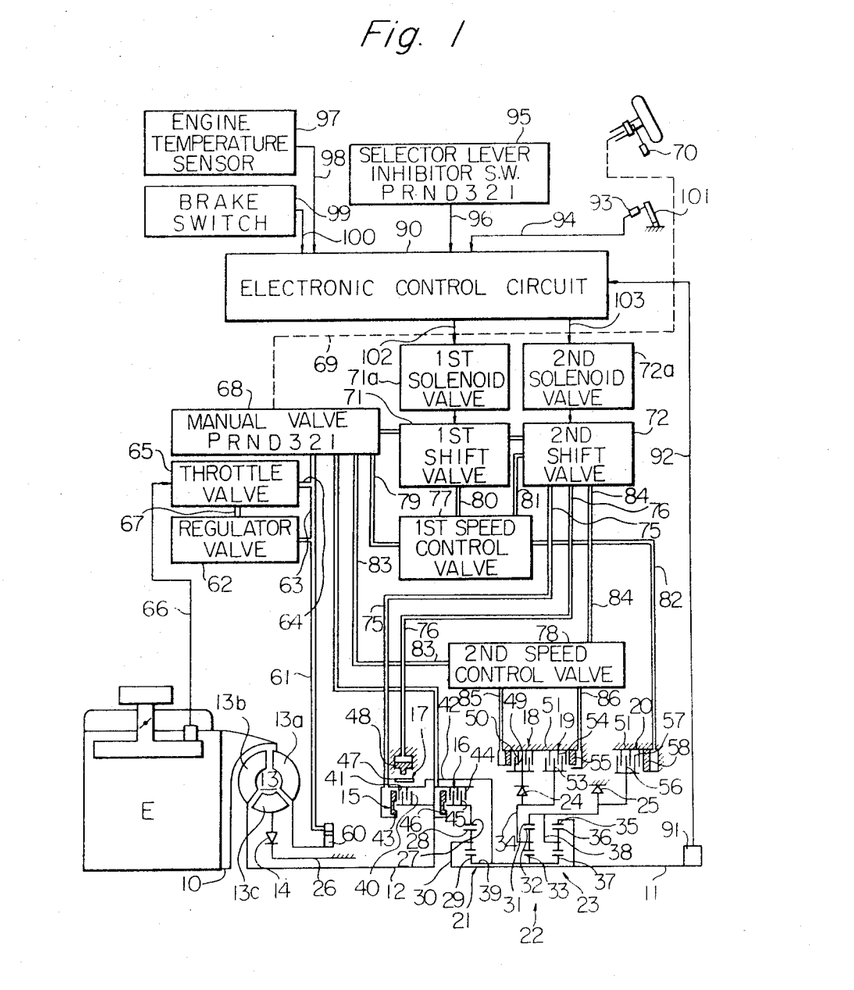
FIG. 1 is a schematic diagram of an automatic power transmission employing a control system according to this invention.

Referring now to FIG. 1, the automatic power transmission to which the control system of this invention is applied comprises a drive shaft 10 and a driven shaft 11. The drive shaft 10 is connected to a suitable power plant which, in this instance, is shown as an internal combustion engine E, and the driven shaft 11 is connected to driving wheels (not shown) of the motor vehicle. The transmission herein shown also comprises a turbine shaft 12 which is in line with the shafts 10 and 11. The transmission also comprises a hydrodynamic torque converter 13 with a one-way brake 14, first and second hydraulically operated friction clutches 15 and 16, first, second, third and fourth hydraulically operated friction brakes 17, 18, 19 and 20, first, second and third planetary gear sets 21, 22 and 23, and first and second free wheeling units 24 and 25, respectively.

The hydraulic torque converter 13 comprises, as customary, a bladed impeller or pump 13a, a bladed rotor or turbine 13b, and a bladed reaction element or stator 13c. The impeller 13a driven from the drive shaft 10, and the rotor is fixed to the turbine shaft 12. The stator 13c is rotatably mounted on a hollow shaft 26, and the one-way brake 14 is mounted between the stator 13c and the hollow shaft 26.

The one-way brake 14 may be of any suitable construction and is so arranged as to allow a free rotation of the stator 13c only in the forward direction of the vehicle, that is, in the direction in which the drive shaft 10 rotates and not in the reverse direction.

The torque converter 13 operates in a manner well known for driving the turbine 13b at an increased torque than the torque impressed on the impeller 13a of the converter. The stator 13c functions to change the direction of flow of the fluid from the turbine 13b to the impeller 13a so as to transfer this increased torque to the turbine 13b. The stator 13c tends to rotate in the same direction as the direction in which the turbine 13b and the impeller 13a rotate when certain speed are reached by the last two elements, whereupon the torque converter 13 now operates essentially as a fluid coupling in which the turbine 13b is driven at a substantially constant speed and without increase in torque with respective to the impeller 13a.

The first planetary gear set 21 has rotary members including an internally toothed outer ring gear 27 associated with the friction clutch 16, two or more plane pinions 28 which externally mesh with the ring gear 27, and a sun gear 29 externally meashing with the planet pinions 28. The planet pinions 28 are carried by a pinion carrier 30 which is connected to the driven shaft 11.

The second planetary gear set 22, similarly, has rotary members including an internally toothed outer ring gear 31 associated with the one-way brake 25 and the friction brake 20, two or more planet pinions 32 externally meshing with the ring gear 31, and a sun gear 33 externally meshing with the planet pinions 32. The planet pinions 32 are carried by a pinion carrier 35 which is associated with the one-way clutch 24 and the friction brake 19. The third planetary gear set 23 also has rotary members including an internally toothed outer ring gear 35 connected to the driven shaft 11, two or more planet pinions 36 externally meshing with the ring gear 35, and a sun gear 37 externally meshing with the planet pinions 36. The planet pinions 36 are carried by a pinion carrier 38, which is shown as connected to the ring gear 31 of the second planetary gear set 22 associated with the free wheeling unit 25 and the friction brake 20.

The rotary members thus arranged are all rotatable concentrically about a common axis which is in line with the driven shaft 11 connected to the pinion carrier 30 of the first planetary gear set 21. As illustrated by way of example, the sun gears 29, 33 and 37 of the first, second and third planetary gear sets 21, 22 and 23, respectively, are connected rigidly to each other through a hollow shaft 39 which is rotatably mounted on the driven shaft 11.

The first friction clutch or front clutch 15 may be of any suitable construction and in the illustrated embodiment comprises a drive portion 40 connected to the turbine shaft 12, and a driven portion 41 connected to a bfake drum 42 rigidly connected to the hollow shaft 39. The front clutch 15 also comprises a servo mechanism 43 for effecting engagement and dis-engagement of the drive portion 40 with the driven portion 41 when a hydraulic pressure is applied and relieved, respectively.

The second friction clutch or rear clutch 16, similarly, comprises a drive portion 44 connected to the turbine shaft 12 and a driven portion 45 connected to the ring gear 27 of the first planetary gear set 21. The rear clutch 16 also comprises a servo mechanism 46 for engaging and dis-engaging the drive portion 44 with and from the driven portion 45.

The first friction brake or third brake 17 is shown to comprise a brake band 47 adapted to act on the brake drum 42, and a servo mechanism 48 associated therewith for actuating the same to brake the sun gears 29, 33 and 37 through the hollow shaft 39 rigidly connected thereto.

The first free wheeling unit 24 is shown as a one-way clutch, which may be constructed in any suitable fashion insofar as it functions to allow a free rotation of the pinion carrier 34 of the second planetary gear set 22 in the direction in which the drive shaft 10 rotates but not in the reverse direction.

The second free wheeling unit 25 is exemplified as a one-way brake, which operates to allow a free rotation of the pinion carrier 38 of the third planetary gear set 23 only in the direction in which the drive shaft 10 rotates.

The second friction brake 18 is connected to the pinion carrier 34 of the second planetary gear set 22 through the one-way clutch 24 providing a free wheel driving, while the third friction brake 19 is connected direct to the pinion carrier 34 of the second planetary gear set 22 to cause the engine to remain coupled to the driving wheels of the vehicle thereby to effect an engine braking action.

The second friction brake or second brake 18 comprises a rotor portion 49 connected through the one-way clutch 24 to the pinion carrier 34 of the second planetary gear set 22, and a stator portion 50 connected to a transmission casing 51. The friction brake 18 is actuated by a servo mechanism 52.

The third friction brake or second brake 19 similarly comprises a rotor portion 53 connected direct to the pinion carrier 34 of the second planetary gear set 22, and a stator portion 54 connected to the transmission casing 51. The friction brake 19 is actuated by a servo mechanism 55.

The fourth friction brake or low and reverse brake 20 comprises a rotor portion 56 connected to the ring gear 31 of the second planetary gear set 22 through the one-way brake 25 and to the pinion carrier 38 of the third planetary gear set 23, and a stator portion 57 connected to the transmission casing 51. The friction brake 20 also comprises a servo mechanism 58. The low and reverse brake 20 is coupled to provide a drive connection between the engine and the driving wheels, when the power flows from the driving wheels to the engine, whereby the engine braking action is brought about. When the power flow is in a normal condition, that is, when the vehicle is driven by the engine, the friction brake 20 is uncoupled. In this condition, however, the output torque delivered to the turbine shaft 12 is passed to the driven shaft 11 by the action of the one-way brake 25, establishing an intended driving speed ratio.

The power transmission operates in a well known manner to provide four forward driving speed ratios and a signle reverse driving speed ratio. A first forward driving speed ratio in the manual first speed or "1" range position is established by engaging the rear clutch 16 and the low and reverse brake 20. With the low and reverse brake 20 actuated, the drive connection is established between the engine and the driving wheels of the motor vehicle so that the engine braking takes place when the power flow is reversed. The second forward driving speed ratio is established when one of the second brakes 18 and 19 is applied with the rear clutch 16 kept engaged. When the second brake 19 is applied, the engine braking action is brought about in the same manner as in the manual first speed. When the second brake 18 is applied in lieu of the second brake 19 the free wheeling action is created. The third speed drive ratio is established when the third brake 17, instead of the second brake 18 or 19, is coupled with the rear clutch 16 kept engaged. The fourth speed drive ratio is established when the manual selector valve is set in an automatic drive or "D" position so that the transmission shifts from the third to the fourth speed drive ratio. The fourth speed drive ratio is established when the front clutch 15, instead of the third brake 17, is applied with the rear clutch 16 kept coupled.

The reverse drive is completed by engaging the low and reverse brake 20 with the front clutch 15 kept engaged.

The friction brakes and clutches thus arranged are actuated by the aid of a control system according to the present invention. The control system comprises a hydraulic control circuit to control the actuation of the friction elements for thereby selectively effecting the shift between the different gear ratios and an electronic control circuit to control the operation of the hydraulic control circuit in accordance with the driving conditions of the motor vehicle.

The hydraulic control circuit includes a source 60 of fluid pressure such as an oil pump which supplies a fluid under pressure to a fluid pressure conduit 61. The fluid pressure conduit 61 communicates with a line pressure regulator valve 62. The regulator valve 62 communicates with a line pressure conduit 63 and operates in a manner well known to regulate the fluid pressure admitted thereto to levels proper for effecting smooth engagement of the friction elements. The line pressure conduit 63 communicates with a conduit 64 which in turn communicates with a throttle valve 65.

The throttle valve 65 is operatively connected through a line 66 to an intake manifold of the engine and operates to modulate the fluid pressure in accordance with the variation in the vacuums in the intake manifold. More specifically, the throttle valve 65 operates to decrease the fluid pressure in a conduit 67 as the intake manifold vacuum increases and the engine torque decreases, and to increase the fluid pressure as the intake manifold vacuum increases and the engine torque increases. The fluid pressure in the conduit 67 is then delivered to the regulator valve 62 and is utilized for regulating the line pressure.

The regulator valve 62 may, if desired, be associated with a cut-back valve, though not shown. The cut-back valve, which may be of any known construction, responds to an electric cut-back signal produced in accordance with variables given by the electronic control circuit described above, and effects cut-back in the fluid pressure supplied from the throttle 65 thereby to decrease the same. This reduced fluid pressure is applied to the regulator valve 62 where it is utilized for further regulating the line pressure in the line pressure conduit 63 to an optimum level to provide a torque appropriate for the friction elements.

The hydraulic control circuit also includes a manual selector valve 68 to which the line pressure is supplied through the conduit 63 from the line pressure regulator valve 62. The manual selector valve 68 is linked through a mechanical linkage 69 with a manual selector lever 70, the linkage being shown by a broken line in FIG. 1. The manual selector valve 68 has the following positions: a "P" or parking position, an "R" or reverse drive position, an "N" or neutral position, a "D" or automatic forward drive position, a "3" or third manual speed position, a "2" or second manual speed position, and "1" or first manual speed position. The manual selector lever 70 controls the manual valve 68 so that the line pressure delivered thereto is passed over to the servo mechanism of the desired friction elements for thereby conditioning the transmission in the desired speed ranges.

To control the fluid flow to the servo mechanisms of the friction elements, the present invention proposes to provide first and second shift valves 71 and 72 in association with the manual valve 68 in the hydraulic control circuit. As shown, the first shift valve 71 communicates with the manual valve 68 through a conduit 73. The second shift valve 72 communicates with the first shift valve 71 through a conduit 74 and cooperates therewith in a manner to be discussed in detail. The second shift valve 72 communicates with the servo mechanisms 43 and 48 of the front clutch 15 and the third brake 17 through conduits 75 and 76, respectively. Each of the first and second shift valves 71 and 72 have two principal positions, which are arranged in such a manner as will be discussed later.

According to the present invention, furthermore, first speed and second speed control valves 77 and 78 are provided in the hydraulic control circuit for controlling the fluid flow to the servo mechanisms of the friction elements thereby to selectively provide free wheel driving and engine brake driving when the transmission is set in its first speed and second speed ranges, respectively. The first speed control valve 77 communicates through a conduit 79 with the manual valve 68, through a conduit 80 with the first shift valve 71, and through a conduit 82 with the servo mechanism 58 of the low and reverse brake 20. The first speed control valve 77 intervenes between the first and second shift valves 71 and 72, and operates to admit the line pressure to the servo mechanism 58 of the low and reverse brake 20 whereby the drive connection is established between the turbine shaft 12 and the drive shaft 11 to effect the engine braking. The first speed control valve 77 has an additional function to prevent the line pressure from entering the servo mechanisms 43 and 48, when the manual valve 68 is set in its manual first speed position, thereby to avoid undue coupling of the front clutch 15 and third brake 17. Occurrence of an accident in the power transmission is thus precluded even in the event of a turbine of the control system. The second speed control valve 78 communicates through a conduit 83 with the manual valve 68, through a conduit 84 with the second shift valve 72, through a conduit 85 with the servo mechanism 52 of the second brake 18, and through a conduit 86 with the servo mechanism 55 of another second brake 19. The second speed control valve 78 is controlled by the manual valve 68 in a manner to selectively establish communication between the conduits 84 and 85 and between the conduits 84 and 86, whereby the free wheeling action or engine braking action is selectively effected in the power transmission. The line pressure delivered to the manual valve 68 is also passed direct to the rear clutch 16 through a conduit 87.

The first and second shift valves 71 and 72 thus arranged are operated by first and second solenoid valves 71a and 72a, respectively. As discussed above, the first and second shift valves 71 and 72 have two principal positions, respectively, which are combined with operating positions of the first and second solenoid valves 71a and 72a so as to provide a plurality of gear ratios as shown in Table I.

TABLE I

| Selected position | Speed range | 1st solenoid 71 and 1st shift valve 71a | 2nd solenoid 72 and 2nd shift valve 72a |
|---|---|---|---|
| P | Neutral | − | − |
| R | Reverse | − | − |
| N | Neutral | − | − |
| D | 1st (free wheeling) | + | + |
|   | 2nd (free wheeling) | + | − |
|   | 3rd | − | − |
|   | 4th | − | + |
| 3 | 3rd lock up | − | + |
|   | 4th—Shifted by the action of the engine protector unit 105. | − | − |
| 2 | 2nd lock up (engine braking) | + | − |
|   | 3rd—Shifted by the engine protector unit 105. | − | + |
|   | 4th— | − | − |
| 1 | 1st lock up (engine braking) | − | − |
|   | 2nd (engine braking)—Shifted by the action of the engine protector unit 105. | + | − |

In Table I, a sign "+" denotes a condition in which the solenoid valves and shift valves coacting therewith are energized to effect any given drive ratio and sign "−" denotes a condition in which the solenoid valves and shift valves coacting therewith are de-energized.

The first and second solenoid valves 71a and 72a operate under the control of an electric signal produced in accordance with operational variables given by the electronic control circuit shown in a block form in FIG. 1. As shown, the electronic control circuit, designated by 90, is connected through a line 92 to a vehicle speed sensor 91 to a throttle opening sensor 93 through a line 94, to a selector lever inhibitor switch 95 through a line 96, to an engine temperature sensor 97 through a line 98, and to a brake switch 99 through a line 100. The vehicle speed sensor 91 detects the revolution speed of the driven shaft 11 and generates a voltage signal corresponding to the detected speed. The throttle opening sensor 93 is interlocked with an accelerator pedal 101 so as to detect the position thereof for thereby generating a voltage signal corresponding to the detected position which approximates an effective throttle area of a carburetor (not identified) of the engine E. The selector lever inhibitor switch 95 is associated with the selector lever 70 and generates a voltage signal indicative of the selected speed range. The engine temperature sensor 97 detects the temperature at which the engine E operates and generates a voltage signal corresponding to the detected temperature. The brake switch 99, which may be of conventional construction and actuated either manually or automatically, operates to detect the road gradient at which the vehicle runs and to produce a voltage signal corresponding to the detected road gradient. Each of the thus generated voltage signals is applied to the electronic control circuit 90 through the lines 92, 94, 96, 98 and 100. The electronic control circuit 90 operates in a manner to produce a shift pattern signal for the intended gear ratio in accordance with the voltage signals delivered thereto for generating an electric signal. This electric signal is the applied through lines 102 and 103 to the first and second solenoid valves 71a and 72a, respectively.

Figure 2:
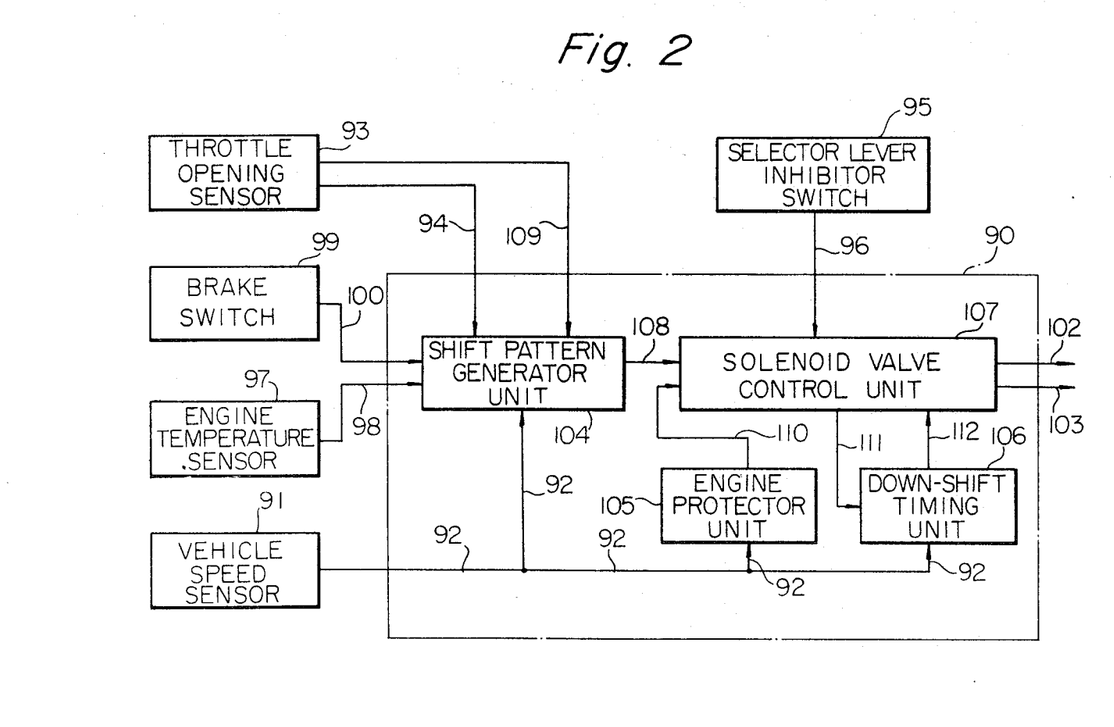
FIG. 2 is a block diagram illustrating a preferred example of the electronic control circuit forming part of the control system shown in FIG. 1.

A preferred example of the electronic control circuit 90 is schematically illustrated in FIG. 2, wherein the electronic control circuit is enclosed by a phantom line. The electronic control circuit 90 largely comprises a shift pattern generator unit 104, an engine protector unit 105, a down-shift timing unit 106 and a solenoid valve control unit 107.

The shift pattern generator unit 104 receives the voltage signals delivered from the throttle opening sensor 93 and the vehicle speed sensor 91 through the lines 94 and 92, respectively, and operates to produce a shift pattern for the intended gear ratio in accordance with the prevailing driving conditions of the vehicle for generating a shifting signal. The shifting signal is then applied through a line 108 to the solenoid valve control unit 107. The shift pattern may be varied so as to raise a shifting point to a higher vehicle speed side when the carburetor throttle valve is fully opened, when the vehicle runs on an ascent, or when the engine is driven cold. When the accelerator pedal 101 (see FIG. 1) is depressed, for example, the throttle opening sensor 93 produces a kick-down signal, which is supplied through a line 109 to the shift pattern generator unit 104. The shift pattern generator unit 104 then changes the shift pattern in such a manner as to cause down-shift in the power transmission. The shift pattern may also be changed by the voltage signal indicative of the engine temperature and the road gradient. These voltage signals are supplied to the shift pattern generator unit 104 through the lines 98 and 100 from the engine temperature sensor 97 and the brake switch 99, respectively. When the vehicle is driven on a road sloping at a certain angle, the shifting point at which the gear shifting takes place from one speed ratio to another is raised to the higher vehicle speed side. Thus, an increased driving performance efficiency is attained when the vehicle is driven on a level road as well as when the vehicle is driven on the ascent or descent. This is advantageous particularly where the vehicle is driven by an engine having a relatively small output capacity. Furthermore, smooth and safety driving is accomplished even when the engine is operating at relatively low temperatures for the reason discussed above.

The engine protector unit 105 is connected through the line 92 to the vehicle speed sensor 91 and receives the voltage signal delivered therefrom. The engine protector unit 105 is adapted to produce an electric signal for protecting the engine from overrunning. This electric signal is then supplied through a line 110 to the solenoid valve control unit 107.

The down-shift timing unit 106 operates to effect smooth down-shift by temporarily conditioning the transmission to a neutral condition until the engine speed reaches a predetermined value when down-shift is effected from the fourth to the third speed drive ratio or from the third speed to the second speed drive ratio. This neutral condition will be referred to as a neutral interval hereinafter. The neutral interval should be longer for a higher vehicle speed. The down-shift timing unit 106 receives the voltage signal delivered from the vehicle speed sensor 91 through the line 92 and generates a pulse having a width corresponding to the neutral interval. This pulse is produced when the down-shift timing unit 106 receives a down-shift signal delivered from the solenoid valve control unit 107 through a line 111 and then supplied through a line 112 to the solenoid valve control unit 107.

The solenoid control unit 107 is connected to the selector lever inhibitor switch 95, through the line 96 to the shift pattern generator unit 104 through the line 108, to the engine protector unit 105 through the line 110 and to the down-shift timing unit 106 through the line 111. All the signals delivered from the selector lever inhibitor switch 95, shift pattern generator unit 104, engine protector unit 105 and down-shift timing unit 106 are supplied to the solenoid valve control unit 107 in which they are converted into a suitable electric signal for controlling the first and second solenoid valves 71a and 72a to effect changes between the different gear ratios. These electric signals are then supplied through the lines 102 and 103 to the respective solenoid valves 71a and 72a for selectively providing the desired gear ratio. During down-shifting from the fourth to the third speed drive ratio and from the third speed drive ratio to the manual second speed drive ratio, the solenoid valve control unit 107 operates to maintain the power transmission in the neutral interval for the duration of the pulse generated by the down-shift timing unit 106 for thereby effecting smooth down-shift of the intended gear ratios. If, furthermore, the selector lever 70 is accidentally shifted to the "1" or "2" range position while the vehicle is driven at a higher speed in the "D" range, then the solenoid valve control unit 107 controls the first and second solenoid valves 71a and 72a so as to effect progressive down-shift from a higher speed drive ratio to a lower speed drive ratio in response to the electric signal delivered from the engine protector unit 105. Thus, the second speed drive ratio is smoothly obtained and the engine braking is effected without inviting an accident in the power transmission.

The following Table II shows the friction elements engaged to complete the power train in each of the forward and reverse drive ratios:

TABLE II

| | Selected position | Speed range | Front clutch 15 | Rear clutch 16 | 3rd brake 17 | 2nd brake (engine braking) 19 | 2nd brake (free wheeling) 18 | Low and reverse brake 20 | One-way brake 25 |
|---|---|---|---|---|---|---|---|---|---|
| | P | Neutral | − | − | − | − | − | + | − |
| | R | Reverse | + | − | − | − | − | + | − |
| | N | Neutral | − | − | − | − | − | − | − |
| | D: | | | | | | | | |
| Normal operation | 1 | 1st | − | + | − | − | − | − | + |
| | 2 | 2nd | − | + | − | − | X | − | − |
| | 3 | 3rd | − | + | X | − | − | − | − |
| | 4 | 4th | X | + | − | − | − | − | − |
| | 3 | 3rd lock up | − | + | X | − | − | − | − |
| | 2 | 2nd lock up | − | + | − | X | − | − | − |
| | 1 | 1st lock up | − | + | − | − | − | + | − |
| | P | Neutral | − | − | − | − | − | + | − |
| | R | Reverse | + | − | − | − | − | + | − |
| | N | Neutral | − | − | − | − | − | − | − |
| Emergency operation | D | 4th | + | + | − | − | − | − | − |
| | 3 | 4th | + | + | − | − | − | − | − |
| | 2 | 4th | + | + | − | − | − | − | − |
| | 1 | 1st | − | + | − | − | − | + | − |

In Table II, the sign "+" is intended to mean that the related friction element is operative, and the "−" to mean that the friction element is inoperative. The letter "X" means that the friction element is electrically actuated.

As seen in Table II, when the manual selector lever 70 is set to "P" position, all the friction elements are disengaged save the low and reverse brake 20, so that the power transmission is maintained in the neutral condition. The reason for engaging the low and reverse brake 20 in this instance is that smooth shifting should be attained when the manual selector lever 70 is moved to "R" position. When the manual selector lever 70 is moved to "N" position, all the friction elements are disengaged so that the transmission is maintained in the neutral condition. When the manual selector lever 70 is moved to the "R" position, the line pressure delivered to the manual valve 68 is passed through the first and second shift valves 71 and 72 to the servo mechanisms 15 and 20 engaging the respective friction elements, thereby establishing the reverse drive ratio. As shown in Table I, when the selector lever 70 is moved to the "P", "R" or "N" position, both the first and second solenoid valves 71a and 72a are de-energized so that the desired speed ranges can be accomplished even in the event the electronic control circuit 90 fails.

In any of the forward drive ranges (i.e., "D," "3," "2 " and "1" ranges), the rear clutch 16 serves as a power input clutch, which is engaged direct by the line pressure delivered through the conduit 87 to the servo mechanism 46.

As the accelerator pedal 101 is depressed when the selector lever 70 is set in the "D" position, the first speed signal is present at the lines 102 and 103, so that the first and second solenoid valves 71a and 72a are energized as seen in Table I. In this condition, the first and second shift valves 71 and 72 cooperates with each other to prevent the line pressure from being supplied to the servo mechanisms of the friction elements 15, 17, 18, 19 and 20 as seen in Table II. The rear clutch 16 is nevertheless actuated by the line pressure in the conduit 87 and, in addition, the one-way brake 25 is operated, with the result that the forward first speed drive ratio is obtained. As the vehicle speed increases, the second solenoid valve 72a is de-energized with the first solenoid valve 71a kept energized by the action of the solenoid valve control unit 107 and coacts, as previously described, with the second shift valve 72 causing the engagement of the second brake 18, whereby the second speed drive ratio is reached and a free wheel driving effected by the action of the one-way clutch 24.

As the vehicle speed further increases, the first solenoid valve 71a is de-energized while the second solenoid valve 72a is energized, as seen in Table I. In this condition, the first and second shift valves 71 and 72 coact with each other, as discussed above, in a manner to supply the line pressure through the conduit 76 to the servo mechanisms of the third brake 17. Thus, the third speed drive ratio is established.

As the vehicle speed still further increases, both the first and second solenoid valves 71a and 72a are de-energized, as seen in Table I, with the result that the front clutch 15 is actuated and thus the fourth speed drive ratio accomplished.

When the selector lever 70 is set in the "3" range position, the first and second solenoid valves 71a and 72a are operated in the same manner as in the "D" range position, completing the third speed drive ratio by the action of the solenoid valve control unit 107. The third brake 17 is now actuated with the rear clutch 16 kept engaged. Thus, the third speed drive ratio is established.

When the selector lever 70 is moved to the "2" range position, the first and second solenoid valves 71a and 72a are operated in the same manner as in the "D" range position, establishing the second speed drive ratio by the action of the solenoid valve control unit 107. In this condition, however, an additional line pressure is supplied through the line 83 from the manual valve 68 to the second speed control valve 78, so that the line pressure is admitted to the servo mechanism 55 of the second brake 19 through the conduit 86. Thus, the second speed drive ratio is obtained to effect the engine braking. When the selector lever 70 is set in the "1" range position, both the first and second solenoid control valves 71a and 72a are de-energized, as seen in Table I, so that the first and second shift valves 71 and 72 coact with each other to supply the line pressure to the first speed control valve 77 from the manual valve 68. In this condition, the line pressure is also supplied through the conduit 79 from the manual valve 68 to the first speed control valve 77, whereby the first speed control valve 77 is operated in such a manner as to pass the line pressure through the conduit 82 over to the servo mechanism of the low and reverse brake 20. Consequently, the low and reverse brake 20 is engaged and, thus, the first speed drive ratio is established and the engine braking results.

Figure 3:
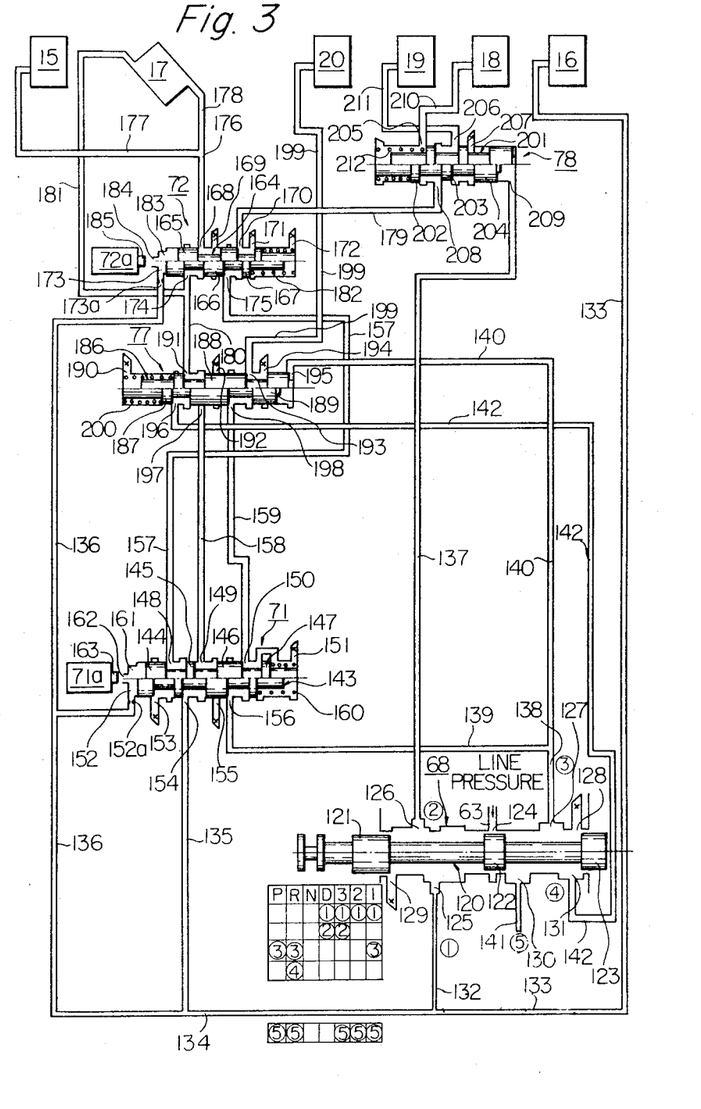
FIG. 3 is a schematic view of the hydraulic control circuit forming part of the control system shown in FIG. 1.

Turning now to FIG. 3, there is schematically shown in detail the hydraulic control circuit which is controlled by the electronic control circuit 90 shown in FIG. 1. While the various control devices such as line pressure regulator valve and throttle valve for regulating the line pressure to an optimum level are not shown in FIG. 3 for simplicity of illustration, it should be kept in mind that the hydraulic control circuit forming part of the control system of this invention is used in combination with such control devices. As shown, the hydraulic control circuit includes a manual valve 68, first shift valve 71, second shaft valve 72, first speed control valve 77 and second speed control valve 78.

The manual valve 68 is controlled by the manual selector lever 70 (see FIG. 1). As previously described, the selector lever 70 has the following positions: a "P" or parking position, an "R" or reverse drive position, an "N" or neutral position, a "D" or automatic forward drive position, a "3" or manual third speed position, a "2" or manual second speed position, and a "1" or manual first speed position. The manual valve 68 has positions in correspondence with these positions of the selector lever 70, as indicated. The line pressure regulated by the regulator valve 62 (see FIG. 1) is supplied through the conduit 63 to the manual valve 68.

The manual valve 68 includes a slidable valve spool 120 having spaced lands 121, 122 and 123. The manual valve 68 also includes a plurality of ports 124, 125, 126, 127, 128, 129, 130 and 131. The port 124 communicates with the conduit 63 connected to the line pressure regulator valve 62 (see FIG. 1). The port 125 communicates with a conduit 132 which in turn communicates with the rear clutch 16 through a conduit 133 and which communicates with a conduit 134 leading to the first and second shift valves 71 and 72 through lines 135 and 136. The port 126 communicates through a conduit 137 with the second speed control valve 78. The port 127 communicates with a conduit 138, which in turn communicates with a conduit 139 leading to the first shift valve 71 and with a conduit 140 leading to the first speed control valve 77. The port 128 and 129 are drain ports. The port 130 communicates with a conduit 141 leading to the suitable control devices (not shown) for modulating the line pressure. The port 131 communicates with a conduit 142 which in turn communicates with the first speed control valve 77. The manual valve 68 thus constructed controls the fluid flow to the first and second shift-valves 71 and 72, and controls the fluid flow to the first speed and second speed control valves 77 and 78.

The first shift valve 71 includes a slidable valve spool 143 having spaced lands 144, 145, 146 and 147. The shift valve 71 has a plurality of ports 148, 149, 150, 151, 152, 153, 154, 155 and 156. The port 148 communicates with a conduit 157 which in turn communicates with the second shift valve 72. The port 149 communicates with a conduit 158 leading to the first speed control valve 77. The port 150 communicates with a conduit 159 leading to the first speed control valve 77. The ports 151, 153 and 155 are drain ports through which an excess of the line pressure is drained off. The port 152, which has an orifice 152a, communicates with the port 125 of the manual valve 68 through the conduits 136, 134 and 132. Likewise, the port 154 communicates with the port 125 of the manual valve 68 through the conduits 135, 134 and 132. The port 156 communicates through the conduits 139 and 138 with the port 127 of the manual valve 68. A spring 160 is provided for biasing the valve spool 143 toward a position to establish the communication between the ports 154 and 149 and the communication between the port 156 and 150. The shift valve 71 has a fluid chamber 161 which communicates not only with, the port 152 but with a jet nozzle 162. The effective sectional area of the jet nozzle 162 is arranged to be larger than that of the orifice 152a. A plunger 163 of the first solenoid valve 71a is positioned opposite to the opening of the jet nozzle 162 for controlling the movement of the valve spool 143. The solenoid valve 71a, which may be of any suitable construction, is controlled by the electric signal generated by the electronic control circuit 90 shown in FIG. 1 or 2 in a manner previously described.

The second shift valve 72 includes a slidable valve spool 164 having spaced lands 165, 166 and 167. The shift valve 72 has a plurality of ports 168, 169, 170, 171, 172, 173, 174 and 175. The port 168 communicates with a conduit 176, which in turn communicates with a conduit 177 leading to the front clutch 15 and with a conduit 178 leading to the release side of the third brake 17. The third brake 17 is shown in FIG. 3 as having, in addition to the release side, an apply side (not numbered) but may be of any suitable construction. In the illustrated embodiment, the third brake 17 is arranged to be engaged when the line pressure is admitted its apply side alone. The ports 169, 171 and 172 are drain ports. The port 170 communicates with a conduit 179 leading to the second speed control valve 78. The port 173, which has an orifice 173a, communicates with the port 125 of the manual valve 68 through the conduits 136, 134 and 132. The port 174 communicates with the first speed control valve 77 through a conduit 180 which also communicates with a conduit 181 leading to the apply side of the third brake 17. The port 175 communicates with the port 148 of the first shift valve 71 through the conduit 157. A spring 182 is provided for biasing the valve spool 164 toward a position to establish the communication between the ports 174 and 168 and the communication between the ports 175 and 170. The shift valve 72 has a fluid chamber 183 which communicates not only with the port 173 but with a jet nozzle 184. The effective sectional area of the jet nozzle 184 is arranged to be larger than that of the orifice 173a. A plunger 185 of the second solenoid valve 72a is mounted on the jet nozzle 182 for controlling the movement of the valve spool 164 so as to selectively interrupt the communication between the ports 174 and 168 and the communication between the ports 175 and 170. The solenoid valve 72a, which may be of any suitable construction, is controlled by the electric signal generated by the electronic control circuit 90, as described above.

The first speed control valve 77 includes a slidable valve spool 186 having spaced lands 187, 188 and 189. The control valve 77 has a plurality of ports 190, 191, 192, 193, 194, 195, 196, 197 and 198. The ports 190, 192 and 194 are drain ports. The port 191 communicates with the port 174 of the second shift valve 72 through the conduit 180 and with the apply side of the third brake 17 through the conduits 180 and 181. The port 193 communicates with a conduit 199 which in turn communicates with the low and reverse brake 20. The port 195 communicates with the conduit 140 leading to the port 127 of the manual valve 68. The port 196 communicates through the conduit 142 with the port 131 of the manual valve 68. The port 197 communicates through the conduit 158 with the port 149 of the first shift valve 71. The port 198 communicates through the conduit 159 with the port 150 of the first shift valve 71. The valve spool 186 is biased by a spring 200 toward a position to interrupt the communication between the ports 198 and 193 whereby the low and reverse brake 20 is unlocked. Such communication between the ports 198 and 193 will be established only when the manual selector lever 70 (see FIG. 1) is set in the "1" or manual first speed position. In this condition, the low and reverse brake 20 is engaged to effect the engine braking while the communication between the ports 197 and 191 is interrupted by the land 188 to prevent the front clutch 15 and the third brake 17 from being locked.

The second speed control valve 78 includes a slidable valve spool 201 having spaced lands 202, 203 and 204. The control valve 78 has a plurality of ports 205, 206, 207, 208 and 209. The port 205 communicates through a conduit 210 with the second brake 18, while the port 206 communicates through a conduit 211 with the second brake 19. The port 207 is a drain port. The port 208 communicates through the conduit 179 with the port 170 of the second shift valve 72. The port 209 communicates through the conduit 137 with the port 126 of the manual valve 68. The valve spool 201 is biased by a spring 212 toward a position to establish the communication between the ports 208 and 206. Such communication between the ports 208 and 206 is established to effect engine braking only when the manual selector lever 70 is set in the "2" position. If the manual selector lever 70 is set in another position, the valve spool 201 is moved toward a position to establish the communication between the ports 208 and 205 against the force of the spring 212 for thereby engaging the second brake 18 to effect free wheeling.

When the manual valve 68 is set to the "P" position, the valve spool 120 is moved in a position in which the port 127 is brought into communication with the port 124. The line pressure delivered to the port 124 is then passed through the port 127 to the conduit 138. The line pressure delivered to the conduit 138 is passed to the port 156 of the first shift valve 71 through the conduit 139 and to the port 195 of the second speed control valve 77 through the conduit 140. In this condition, the first solenoid valve 71a is de-energized so that the valve spool 143 is moved leftwardly of the drawing by the force of the spring 160. With the valve spool in this position the port 156 communicates with the port 150 so that the line pressure delivered to the port 156 is passed through the conduit 159 to the port 198 of the second speed control valve 77. The valve spool 186 of the second speed control valve 77 is, in this condition, moved leftwardly of the drawing against the force of the spring 200 so that the port 198 communicates with the port 193. Thus, the line pressure delivered to the port 198 is admitted through the conduit 199 to the low and reverse brake 20, which is consequently engaged. In this instance, however, all the friction elements are disengaged except for the low and reverse brake 20 so that the transmission is maintained in the neutral condition. The purpose for engaging the low and reverse brake 20 is to effect shift from "P" to "R" position.

When the manual valve 68 is set to the "R" position, the line pressure is admitted to the same conduits as when the manual valve 68 is set to the "P" position with the exception that the line pressure is delivered through the conduit 142 to the port 196 of second speed control valve 77. In this condition, the line pressure acts on the land 189 of the second speed control valve 77 so that the port 196 communicates with the port 191. Consequently, the line pressure delivered to the port 196 is permitted to flow through the conduit 180 into the port 174 of the second shift valve 72. Since the second solenoid valve 72a is de-energized in this condition, the valve spool 164 is moved leftwardly of the drawing by the force of the spring 182. Consequently, the port 174 communicates with the port 168, thereby admitting the line pressure to the front clutch 15 through the conduit 177. The front clutch 15 is then engaged and thus the reverse drive ratio is obtained.

When the manual valve 68 is set to the "N" position illustrated in FIG. 3, the port 124 is closed by the valve land 122 of the manual valve 68 so that the line pressure is isolated from any of the friction elements. Consequently, all the friction elements are dis-engaged and thus the transmission is maintained in the neutral condition.

When the manual valve 68 is moved to the "D" position, the line pressure delivered to the port 124 is admitted not only to the port 125 but also to the port 126. The line pressure admitted to the port 125 is passed direct through the conduit 132 leading to the conduit 133. Thus, the rear clutch 16 is at all times engaged for all forward speed ranges. The line pressure in the conduit 132 is supplied to the ports 152 and 154 of the first shift valve 71 through the conduits 135 and 136, respectively, and to the port 173 of the second shift valve 72.

Since the electronic control circuit operates to energize and de-energize the first and second solenoid valves 71a and 72a in a manner prescribed in Table I, the forward speed range is effected by the electric signal delivered to the solenoid valves 71a and 72a.

When the first speed electric signal is generated by the solenoid valve control unit 107, both the first and second solenoid valve are energized so that the plungers 163 and 185 are caused to protrude. Consequently, the valve spools 143 and 186 are moved rightwardly of the drawing against the forces of the springs 160 and 182. This causes the port 154 to communicate with the port 148, thereby passing the line pressure over to the port 175 through the conduit 157. The port 175 is, however, closed by the land 166 of the second shift valve 72 so that the line pressure is absent in the conduit 179. Thus, only the rear clutch 16 is engaged and, therefore the first speed drive ratio is obtained by the action of the one-way brake 25.

As the vehicle speed increases to the shifting point from the first to the second speed drive ratio, then the second solenoid valve 72a is de-energized with the first solenoid valve 71a kept energized by the solenoid valve control unit 107, so that the valve spool 164 of the second shift valve 72 is moved leftwardly of the drawing by the force of the spring 182. The port 175 communicates with the port 170, thereby passing the line pressure over to the port 208 of the second speed control valve 78 through the conduit 179. Since, now, the line pressure acts on the land 204 of the second speed control valve 78, the valve spool 201 is moved leftwardly of the drawing against the force of the spring 212, so that the port 208 communicates with the port 205. Consequently, the line pressure delivered to the port 208 is admitted to the second brake 18 through the conduit 210, and thus the second speed drive ratio is established by the action of the one-way clutch 24 to effect the free wheeling.

As the vehicle speed further increases, the first solenoid valve 71a is de-energized while the second solenoid valve 72a is energized. The port 154 communicates with the port 149, thereby permitting the line pressure to flow through the conduit 158 to the port 197 of the first speed control valve 77. Since the valve spool 186 is moved rightwardly of the drawing by the force of the spring 200, the port 197 communicates with the port 191 so that the line pressure delivered to the port 197 is admitted to the conduit 180. The valve spool 164 of the second shift valve 72 is moved rightwardly of the drawing against the force of the spring 182 so that the port 174 is closed by the land 165. Consequently, the line pressure admitted to the conduit 180 is allowed into the apply side of the third brake 17 alone. Thus, the third brake 17 is engaged and the third speed drive ratio is obtained.

As the vehicle speed still further, both the solenoid valves 71a and 72a are de-energized so that the communication between the ports 154 and 149 and between the ports 174 and 168 are established. Consequently, the line pressure delivered to the port 154 of the first shift valve 71 is admitted through the conduits 158, 180, 176 and 178 to the release side of the third brade 17 and to the front clutch 15 through the conduit 177 communicating with the conduit 176. Thus, the fourth speed drive ratio is established.

When the manual valve is moved to the "3" range position, the line pressure is admitted to the same conduits as when the manual valve 68 is in the "D" position and the vehicle is driven at the third speed drive ratio. Since, in this condition, the port 124 communicates with the port 130, the line pressure to be delivered to the third brake 17 may be modulated to a higher level in a known fashion for thereby fast effecting the engine braking.

When the manual valve 68 is set to the "2" range position, the port 124 communicates not only with the port 125 but also with the port 130. With the manual valve 68 in this position, the first solenoid valve 71a is energized while the second solenoid valve 72a is deenergized by the action of the solenoid valve control unit 107. Thus, the solenoid valves 71a and 72a are operated in the same manner as when the manual valve 68 is set to the "D" position and the second speed drive ratio is established. It thus follows that the line pressure delivered to the port 125 is passed to the port 208 of the second speed control valve 78 through the first and second shift valves 71 and 72. Since, in this condition, there is no line pressure acting on the land 204 of the second speed control valve 78, the valve spool 201 is moved rightwardly of the drawing by the force of the spring 212. Consequently, the port 208 communicates with the port 206, thereby admitting the line pressure to the second brake 19 through the conduit 211. Thus, the second brake 19 is engaged and, therefore, the second speed drive ratio is established with the result that the engine braking is effected.

When the manual valve 68 is set to the "1" range position, the line pressure is admitted to the ports 125 and 127. The line pressure admitted to the port 125 is delivered to the port 154 of the first shift valve 71 through the conduits 132, 134 and 135. The line pressure admitted to the port 127 is passed to the ports 156 of the first shift valve 71 and to the port 195 of the first speed control valve 77 through the conduits 138. In this condition, both the solenoid valves 71a and 72a are deenergized so that the valve spools 143 and 164 of the first and second shift valves 71 and 72 are moved leftwardly by the forces of the springs 160 and 182. Consequently, the line pressure admitted to the port 125 is passed through the conduits 132, 135 and 158 to the port 197 of the first speed control valve 77. Since, in this condition, the valve spool 186 of the first speed control valve 77 is moved leftwardly against the force of the spring 200 by the line pressure acting on the land 189, the port 197 is closed by the land 188 while the port 198 communicates with the port 193. Consequently, the line pressure delivered to the port 156 is permitted to flow into the low and reverse brake 20 through the conduits 159 and 199. Thus, the low and reverse brake 20 is engaged thereby to complete the first speed drive ratio with the result that the engine braking is effected.

If the electronic control circuit fails to complete its operation either of the solenoid valves 71a and 72a becomes inoperative so that, when the manual selector lever 70 is set in the "D", "3" or "2" range position, the fourth speed drive ratio is obtained. When, however, the manual selector lever 70 is set to the "1" range position, the line pressure delivered to the conduit 158 is prevented from being supplied through the conduit 180 to the conduit 177 leading to the front clutch 15 since the line pressure passed to the port 127 is admitted to the port 195 of the first speed control valve 77 through the conduit 140 to act on the land 189 of the valve spool 186 to interrupt the communication between the ports 197 and 191. In this condition, the line pressure passed to the port 127 is admitted to the low and reverse brake 20 through the conduits 138, 139, 159 and 199. Thus, the low and reverse brake 20 is engaged and, therefore, the first speed drive ratio is obtained.

If, for instance, the selector lever 70 is accidentally shifted from "D" to "2" range position with the vehicle driven at the fourth of third speed ratio, down-shift will be automatically effected with a decrease of the vehicle speed by the control system according to this invention. Consequently, the selector lever 70 can be immediately set to the "2" range position even at high speed forward drive ratio when it is desired to effect the engine braking as during descending of the vehicle.

It should now be understood from the foregoing description that the control system implementing this invention has the following advantages:

1. The control system according to the present invention is readily adaptable to an automatic power transmission providing four forward speed drive ratios and a single reverse drive ratio so as to increase the driveability thereof.

2. The hydraulic control circuit forming part of the control system includes, in addition to a manual selector valve for conditioning the transmission for forward or reverse drive, four valve means two of which are adapted to be responsive to an electric signal produced by the electronic control circuit for effecting shift between the different gear ratios so as to meet prevailing driving conditions of the motor vehicle and the other two of which are associated with the manual selector valve for providing first speed and second speed drive ratios with or without engine braking action.

3. The first speed control valve is interposed between the manual selector valve and the servo mechanism of the friction elements to provide third and fourth speed drive ratios, respectively, so that the transmission is prevented from upshifting or downshifting once the selector lever has been selected to the manual first speed position and, therefore, the driving safety is considerably enhanced.

4. The shift valves have two principal positions, respectively, which are combined so as to correspond to a first speed forward drive ratio (free wheel driving), a second speed driving (free wheel driving), a third speed forward drive ratio and a fourth speed drive ratio, respectively, so that the control system can be simplified in construction. In case the electronic control circuit happens to malfunction, the driving safety is assured by shifting first speed or second speed drive ratio with free wheeling action.

5. Since the shift valves and the solenoid valves coacting therewith are arranged to operate in the same fashion through the ranges of "2," "3" and "D", the upshifting is electronically effected from lower to higher speed. In this instance, the engine braking action is brought about when the selector lever is set to the "2" position.

6. The electronic control circuit is arranged to produce an electric signal having a pulse corresponding to the neutral interval for thereby effecting smooth downshift.

7. The hydraulic control circuit is arranged in such a manner that the line pressure delivered to the manual valve is passed direct to the first speed control valve for thereby eliminating the occurrence of malfunction.

8. Selection of free wheel driving or engine brake driving at the second speed drive ratio is facilitated.

What is claimed is:

1. In automatic power transmission of a motor vehicle driven by an engine and having a drive shaft, a driven shaft, a plurality of planetary gear sets interposed between said drive and driven shafts for providing drive connection therebetween at different gear ratios, each of said plurality of planetary gear sets having rotary members, first and second free-wheeling units connected to at least two of said rotary members of said planetary gear sets for preventing rotations of said rotary members in one direction, and a plurality of friction elements for controlling relative motions of said rotary members of said planetary gear sets, said plurality of friction elements including two different second brakes and a low and reverse brake, one of said second brakes cooperating with said first free-wheeling unit and engageable to cause said first free-wheeling unit to provide free-wheeling action while the other one of said second brakes is engageable to prevent rotation of that rotary member which is connected to said first free-wheeling unit in any direction thereby to provide an engine braking action, and said low and reverse brake being engageable to prevent rotation of that rotary member which is connected to said second free-wheeling unit in any direction to provide an engine braking action, a control system comprising a source of fluid under pressure; a plurality of fluid pressure operated servo means selectively communicating with said source of fluid under pressure for controlling the actuation of said plurality of friction elements; a manual selector valve communicating with said source of fluid under pressure and having a Drive position, a II position and a I position; and first and second shift valves communicating with said manual selector valve and cooperating with each other for selectively admitting fluid under pressure from said source of fluid under pressure to said fluid pressure operated servo means for actuating respective friction elements; and first and second speed control valves communicating with said manual selector valve, said first speed control valve being hydraulically connected to said fluid pressure operated servo means for said low and reverse brake while said second speed control valve is hydraulically connected to said fluid pressure operated servo means for said second brakes, said first speed control valve having means movable to a position to provide fluid communication between said manual selector valve and said fluid pressure operated servo means for said low and reverse brake when said manual selector valve is set in its I position to provide an engine braking action, and said second speed control valve having means movable to one position to provide fluid communication between said manual selector valve and said fluid pressure operated servo means for said one of said second brakes when said manual selector valve is set in its Drive position to cause said first free-wheeling unit to provide free-wheeling action and movable to another position to provide fluid communication between said manual selector valve and said fluid pressure operated servo means for said other one of said second brakes when said manual selector valve is set in its II position to provide an engine braking action.

2. In an automatic power transmission of a motor vehicle driven by an engine and having a drive shaft, a driven shaft, a plurality of planetary gear sets interposed between said drive and driven shafts for providing drive connection therebetween at different gear ratios, each of said plurality of planetary gear set having rotary members, first and second free-wheeling units connected to at least two of said rotary members of said planetary gear sets for preventing rotations of said rotary members in one direction, and a plurality of friction elements for controlling relative motion of said rotary members of said planetary gear sets, said plurality of friction elements including two different second brakes and a low and reverse brake, one of said second brakes cooperating with said first free-wheeling unit and engageable to cause said first free-wheeling unit to provide free-wheeling action while the other one of said second brakes is engageable to prevent rotation of said rotary member connected to said first free-wheeling unit in any direction thereby to provide an engine braking action, and said low and reverse brake being engageable to prevent rotation of that rotary member which is connected to said second free-wheeling unit in any direction to provide an engine braking action, a control system comprising a source of fluid under pressure; a plurality of fluid pressure operated servo means selectively communicating with said source of fluid under pressure for controlling the actuation of said plurality of friction elements; a manual selector valve communicating with said source of fluid under pressure and having a Drive position, a II position and a I position; and first and second shift valves communicating with said manual selector valve and cooperating with each other for selectively admitting fluid under pressure from said source of fluid under pressure to said fluid pressure operated servo means for actuating respective friction elements; and first and second speed control valves interposed between said manual selector valve and said servo means for said low and reverse brake and said second brakes for controlling the flow of fluid under pressure from said source of fluid under pressure to said servo means thereby to selectively provide free-wheeling action and engine braking action, said first speed control valve having a first port communicating with said manual selector valve, a second port communicating with said servo means for said low and reverse brake, a third port communicating with said manual selector valve to receive a fluid under pressure therefrom when said manual selector valve is set in its I position, a valve spool for controlling fluid communication between said first and second ports, and a spring means biasing said valve spool to a position to interrupt fluid communication between said first and second ports, said valve spool being movable to another position against the action of said spring means to provide fluid communication between said first and second ports in response to the fluid under pressure supplied to said third port, and said second speed control valve having a first port communicating with said manual selector valve, second port communicating with said servo means for said one of said second brakes, a third port communicating with said servo means for said other one of said second brakes, a fourth port communicating with said manual selector valve to receive a fluid under pressure therefrom when said manual selector valve is set in its Drive position, a valve spool for controlling fluid communications between said first and second ports and between said first and third ports, a spring means for biasing said valve spool of said second speed control valve to a position to provide fluid communication between said first and third ports, said valve spool of said second speed control valve being movable to another position against the action of said spring means of said second speed control valve to provide fluid communication between said first and second ports in response to the fluid under pressure supplied to said fourth port.

3. In an automatic power transmission of a motor vehicle, driven by an engine the combination comprising a drive shaft; a driven shaft; a hydraulic torque converter having an impeller connected to said drive shaft, a rotor fixed to a turbine shaft which is in line with said drive and driven shafts, and a stator; first, second and third planetary gear sets interposed between said drive and driven shafts for providing drive connection therebetween at different gear ratios, each of said planetary gear sets having rotary members including an internally toothed ring gear, a carrier carrying at least one planet pinion meshing with said ring gear and a sun gear externally meshing with said planet pinion, said carrier of said first planetary gear set being connected to said driven shaft, said sun gears of said first, second and third planetary gear sets being connected to each other and to a brake drum, said ring gear of said second planetary gear set and said pinion carrier of said third planetary gear set being connected to each other and said ring gear of said third planetary gear set being connected to said driven shaft; a first free-wheeling unit connected to said pinion carrier of said second planetary gear set for preventing rotation of said pinion carrier of said second planetary gear set in one direction; a second free-wheeling unit connected to said ring gear of said second planetary gear set and said pinion carrier of said third planetary gear set for preventing rotations of said ring gear of said second planetary gear set and said pinion carrier of said third planetary gear set; a first friction clutch disposed between said turbine shaft and said brake drum for providing a drive connection therebetween when engaged, said first friction clutch having a servo mechanism into which a fluid under pressure is selectively supplied for engaging said first friction clutch; a second friction clutch disposed between said turbine shaft and said ring gear of said first planetary gear set for providing a drive connection therebetween when engaged, said second friction clutch having a servo mechanism into which a fluid under pressure is selectively supplied for engaging said second friction clutch; a first friction brake having a brake band adapted to act on said brake drum for holding said brake drum and said sun gears stationary and having a servo mechanism into which a fluid under pressure is selectively supplied for braking said sun gears; a second friction brake connected to said pinion carrier of said second planetary gear set through said free-wheeling unit adapted for providing a free-wheel driving when second friction brake is engaged, said second friction brake having a servo mechanism into which a fluid under pressure is selectively supplied for engaging said second friction brake; a third friction brake connected directly to said pinion carrier of said second planetary gear set for preventing rotation of said pinion carrier of said second planetary gear set in either direction when engaged thereby to effect an engine braking action, said third friction brake having a servo mechanism into which a fluid under pressure is supplied for engaging said third friction brake; a fourth friction brake connected to said ring gear of said second planetary gear set and to said pinion carrier of said third planetary gear set for preventing rotations of said ring gear of said second planetary gear set and said pinion carrier of said third planetary gear set in either directions when engaged thereby to provide an engine braking action; a source of fluid under pressure; a manual selector valve communicating with said source of fluid under pressure and having a plurality of different positions including a Drive position, a II position and a I position; first and second shift valves communicating with said manual selector valve and said servo mechanisms of said friction clutches and brakes, said shift valves cooperating with each other for delivering said fluid under pressure from said source of fluid under pressure to said servo mechanisms for selectively actuating said friction clutches and brakes to control relative motions of said rotary members of said first, second and third planetary gear sets; and first and second speed control valves communicating with said manual selector valve, said first speed control valve being hydraulically connected to said servo mechanism of said fourth friction brake while said second speed control valve is hydraulically connected to said servo mechanisms of said second and third friction brakes respectively, said first speed control valve having means movable to a position to provide fluid communication between said manual selector valve and said servo mechanism of said fourth friction brake when said manual selector valve is moved to its I position, and said second speed control valve having means movable to one position to provide fluid communication between said manual selector valve and said servo mechanism of said second friction brake when said manual selector valve is moved in its Drive position and movable to another position to provide fluid communication between said manual selector valve and said servo mechanism of said third friction brake when said manual selector valve is moved in its II position.

* * * * *